United States Patent
Kobayashi et al.

(10) Patent No.: US 6,671,455 B1
(45) Date of Patent: Dec. 30, 2003

(54) MAGNETIC RECORDING APPARATUS AND METHOD THEREFOR, AND MAGNETIC RECORDING AND REPRODUCTION APPARATUS AND METHOD THEREFOR

(75) Inventors: Takafumi Kobayashi, Kanagawa (JP); Masayoshi Kumagawa, Chiba (JP); Ryuji Abe, Kanagawa (JP); Tomoyuki Miyakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/504,681

(22) Filed: Feb. 15, 2000

(30) Foreign Application Priority Data

Feb. 16, 1999 (JP) .......................................... 11-037470

(51) Int. Cl.[7] ................................................ H04N 5/95
(52) U.S. Cl. ........................ 386/88; 386/124; 360/77.15
(58) Field of Search ............................... 386/88, 81, 79, 386/95, 96, 121, 68, 80, 46, 117, 124; 360/27, 77.14, 77.15; H04N 5/95

(56) References Cited

U.S. PATENT DOCUMENTS

| | | | | |
|---|---|---|---|---|
| 4,663,673 A | * | 5/1987 | Doutsubo | 386/68 |
| 4,814,900 A | * | 3/1989 | Nemoto et al. | 386/79 |
| 4,891,644 A | * | 1/1990 | Noro | 360/77.01 |
| 4,984,104 A | * | 1/1991 | Takahashi et al. | 360/77.14 |
| 5,396,374 A | * | 3/1995 | Kubota et al. | 386/95 |
| 5,396,378 A | * | 3/1995 | Yokoyama | 386/121 |
| 5,648,879 A | * | 7/1997 | Takano | 386/81 |

* cited by examiner

Primary Examiner—Vincent Boccio
(74) Attorney, Agent, or Firm—Frommer Lawerence & Haug LLP; William S. Frommer

(57) ABSTRACT

Recording data having a data format corresponding to a predetermined digital recording method is generated and the recording data of two tracks in the digital recording method is continuously recorded in one track on magnetic tape. In addition, in this case, control data indicating the arrangement of the frequencies of pilot signals in each track on the magnetic tape is inverted at an interval of two frames in the NTSC system and of one frame in the PAL system and placed in the recording data.

12 Claims, 10 Drawing Sheets

FIG. 1
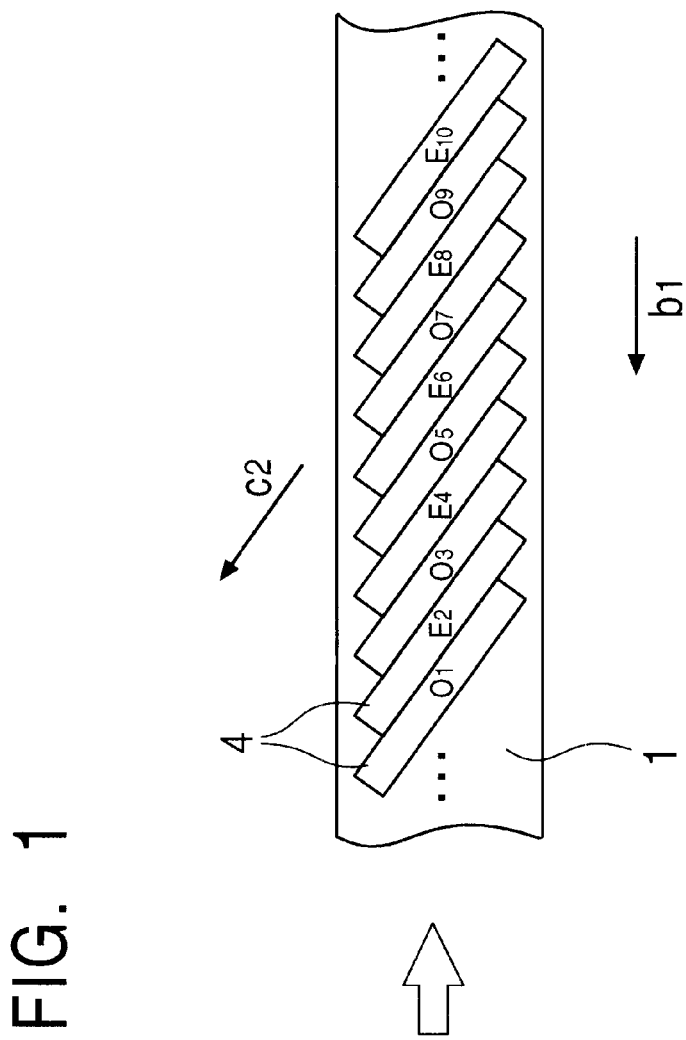
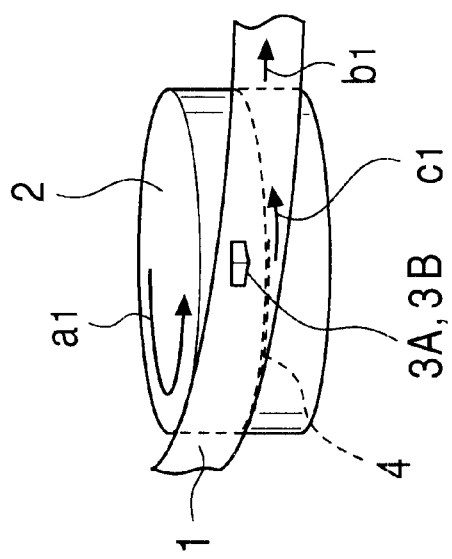

FIG. 3
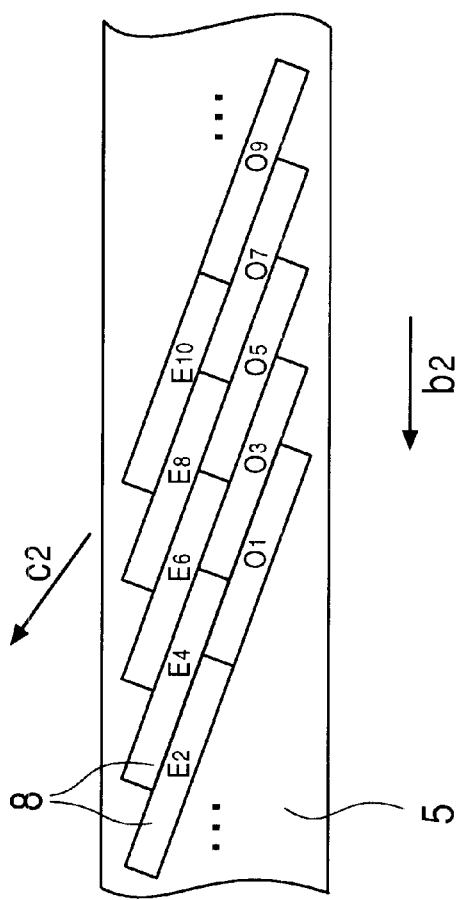
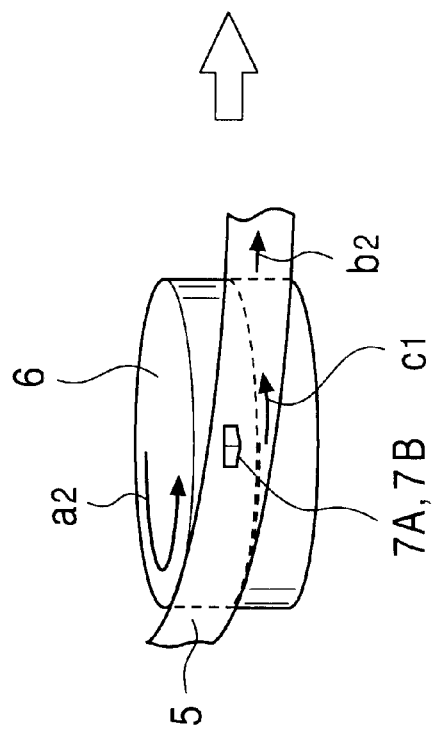

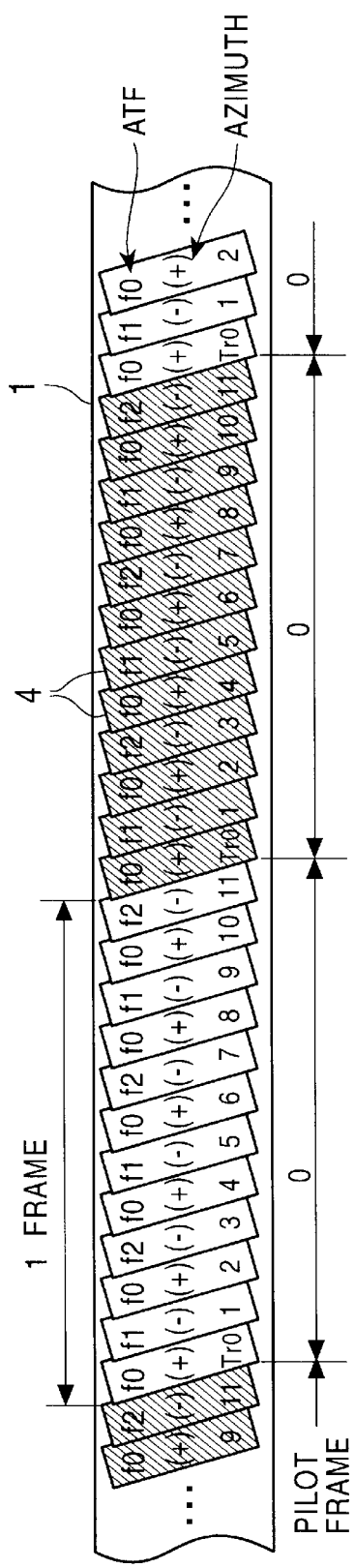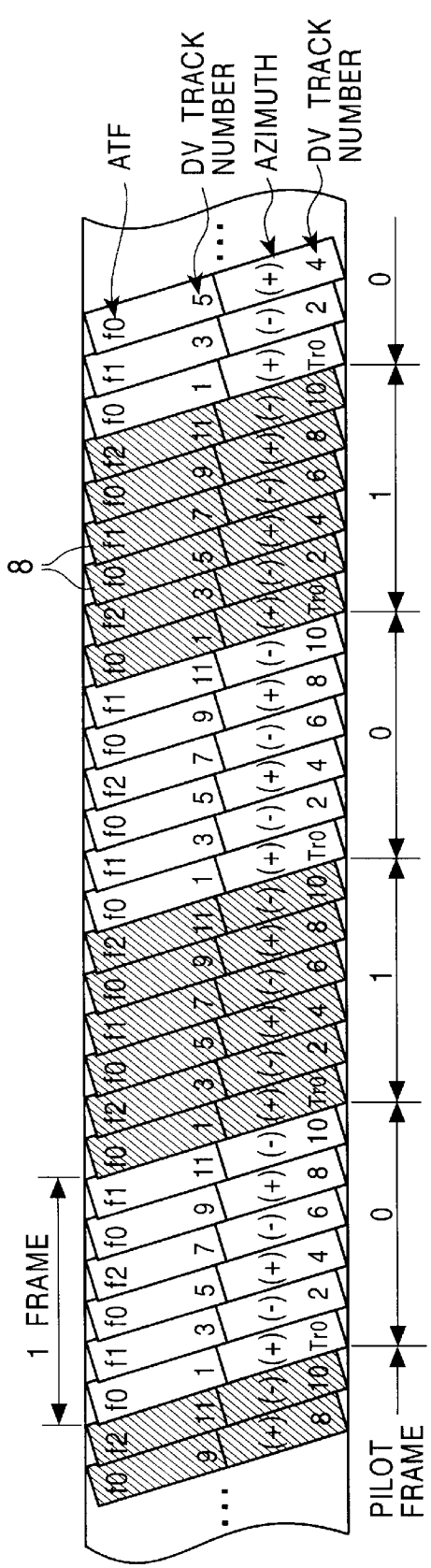

MAGNETIC RECORDING APPARATUS AND METHOD THEREFOR, AND MAGNETIC RECORDING AND REPRODUCTION APPARATUS AND METHOD THEREFOR

BACKGROUND OF THE INVENTION

1. Field of the Invention

The present invention relates to magnetic recording apparatuses and methods therefor, and magnetic recording and reproduction apparatuses and methods therefor, and for example, to those suited to digital video cameras.

2. Description of the Related Art

As a recording method for digital video tape recorders, the Digital Video (DV) method (IEC 61834, helical scan digital video tape cassette recording system using 6.35 mm magnetic tape for consumers (525/60, 625/50, 1125/60, and 1250/50 systems)) has been conventionally used. Video cameras and installation-type video tape recorders employing the DV method have been commercially available these years.

In the DV method, magnetic tape (hereinafter called DV tape) to be used has a width of 6.35 mm (=one fourth inch), which is narrower than the tape width (8 mm) of magnetic tape (hereinafter called 8-mm tape) to be used by the Analog 8-mm method (IEC 60843, helical scan video tape cassette recording system using 8 mm magnetic tape for consumers), which has been widely used as a recording method for conventional analog video tape recorders.

Since the DV method compresses video and audio signals to be recorded and uses an increased recording density with a narrower tape width, high-quality recording is implemented for a long period of time.

Although the DV method is not compatible with the Analog 8-mm method, if video and audio signals conforming to the DV-method data format can be recorded on 8-mm tape, which is wider than the DV tape, video and sound can be recorded for a long period of time with high quality. In addition, current resources for 8-mm tape such as production facilities and related components can be effectively used for cases in which the DV method is employed as well as for cases in which the Analog 8-mm method is employed.

When a function for reproducing analog 8-mm tape is further provided, analog 8-mm libraries and other resources can be enjoyed.

SUMMARY OF THE INVENTION

Accordingly, it is an object of the present invention to provide a magnetic recording apparatus and a method therefor, and a magnetic recording and reproduction apparatus and a method therefor which allow a video signal to be recorded with high quality for a long period of time.

The foregoing object is achieved in one aspect of the present invention through the provision of a magnetic recording apparatus including recording-data generation means for applying predetermined signal processing which includes processing for adding a pilot signal for tracking control, to a video signal to generate recording data having a data format corresponding to a predetermined digital recording method; and recording means for sequentially recording the recording data generated by the recording-data generation means, of two tracks in the digital recording method continuously in one track on magnetic tape, wherein the recording-data generation means places in the recording data one-bit control data indicating the arrangement of the frequencies of pilot signals in tracks on the magnetic tape, the one-bit control data being inverted at an interval of two frames in the NTSC system and of one frame in the PAL system.

In the magnetic recording apparatus, since recording data having a data format corresponding to a digital recording method, of two tracks in the digital recording method is continuously recorded in one track on magnetic tape, a video signal can be recorded with high quality for a long period of time. In addition, when the next scene is recorded on magnetic tape where recording data has been recorded; according to the control data included in the recording data, the frequencies of pilot signals to be added to recording data to be newly recorded for the next scene are easily determined such that the arrangement of the frequencies of the pilot signals which have been recorded in tracks where the recording data has been recorded is followed by a predetermined pattern.

The foregoing object is achieved in another aspect of the present invention through the provision of a magnetic recording method including a first step for applying predetermined signal processing which includes processing for adding a pilot signal for tracking control, to a video signal to generate recording data having a data format corresponding to a predetermined digital recording method; and a second step for sequentially recording the generated recording data of two tracks in the digital recording method continuously in one track on magnetic tape, wherein, in the first step, one-bit control data indicating the arrangement of the frequencies of pilot signals in tracks on the magnetic tape, the one-bit control data being inverted at an interval of two frames in the NTSC system and of one frame in the PAL system, is placed in the recording data.

According to the magnetic recording method, since recording data having a data format corresponding to a digital recording method, of two tracks in the digital recording method is continuously recorded in one track on magnetic tape, a video signal can be recorded with high quality for a long period of time. In addition, when the next scene is recorded on magnetic tape where recording data has been recorded; according to the control data included in the recording data, the frequencies of pilot signals to be added to recording data to be newly recorded for the next scene are easily determined such that the arrangement of the frequencies of the pilot signals which have been recorded in tracks where the recording data has been recorded is followed by a predetermined pattern.

The foregoing object is achieved in yet another aspect of the present invention through the provision of a magnetic recording and reproduction apparatus including recording-data generation means for applying predetermined signal recording processing which includes processing for adding a pilot signal for tracking control, to a video signal to generate recording data having a data format corresponding to a predetermined digital recording method; and recording means for sequentially recording the recording data generated by the recording-data generation means, of two tracks in the digital recording method continuously in one track on magnetic tape, wherein the recording-data generation means places in the recording data one-bit control data indicating the arrangement of the frequencies of pilot signals in tracks on the magnetic tape, the one-bit control data being inverted at an interval of two frames in the NTSC system and of one frame in the PAL system.

In the magnetic recording and reproduction apparatus, since recording data having a data format corresponding to a digital recording method, of two tracks in the digital recording method is continuously recorded in one track on magnetic tape, a video signal can be recorded with high quality for a long period of time. In addition, when the next scene is recorded on magnetic tape where recording data has been recorded; according to the control data included in the recording data, the frequencies of pilot signals to be added to recording data to be newly recorded for the next scene are easily determined such that the arrangement of the frequencies of the pilot signals which have been recorded in tracks where the recording data has been recorded is followed by a predetermined pattern.

The foregoing object is achieved in still another aspect of the present invention through the provision of a magnetic recording and reproduction method including a first step for applying predetermined signal recording processing which includes processing for adding a pilot signal for tracking control, to a video signal to generate recording data having a data format corresponding to a predetermined digital recording method; and a second step for sequentially recording the generated recording data of two tracks in the digital recording method continuously in one track on magnetic tape, wherein, in the first step, one-bit control data indicating the arrangement of the frequencies of pilot signals in tracks on the magnetic tape, the one-bit control data being inverted at an interval of two frames in the NTSC system and of one frame in the PAL system, is placed in the recording data.

According to the magnetic recording and reproduction method, since recording data having a data format corresponding to a digital recording method, of two tracks in the digital recording method is continuously recorded in one track on magnetic tape, a video signal can be recorded with high quality for a long period of time. In addition, when the next scene is recorded on magnetic tape where recording data has been recorded; according to the control data included in the recording data, the frequencies of pilot signals to be added to recording data to be newly recorded for the next scene are easily determined such that the arrangement of the frequencies of the pilot signals which have been recorded in tracks where the recording data has been recorded is followed by a predetermined pattern.

As described above, according to the present invention, since recording data having a data format corresponding to a predetermined digital recording method is generated and the recording data of two tracks in the digital recording method is continuously recorded in one track on magnetic tape, a video signal can be recorded with high quality for a long period of time. In addition, in this case, since control data indicating the arrangement of the frequencies of pilot signals in tracks on the magnetic tape is inverted at an interval of two frames in the NTSC system and of one frame in the PAL system and placed in recording data, the frequencies of pilot signals to be added to recording data to be newly recorded for the next scene are easily determined according to the control data such that tracking is maintained even at the boundary of a recorded video signal and a video signal for the next scene. Therefore, a magnetic recording apparatus and a method therefor, and a magnetic recording and reproduction apparatus and a method therefor, which allow a circuit structure and a program to be simplified are implemented.

BRIEF DESCRIPTION OF THE DRAWINGS

FIG. 1 is an outlined view showing recording conditions in the Digital Video (DV) method.

FIG. 3 is an outlined view showing recording conditions in a digital 8-mm method.

FIG. 5A is an outlined view showing an ATF format used for the PAL system in the DV method.

FIG. 5B is an outlined view showing an ATF format used for the PAL system in the digital 8-mm method.

DESCRIPTION OF THE PREFERRED EMBODIMENT

Figure 2:
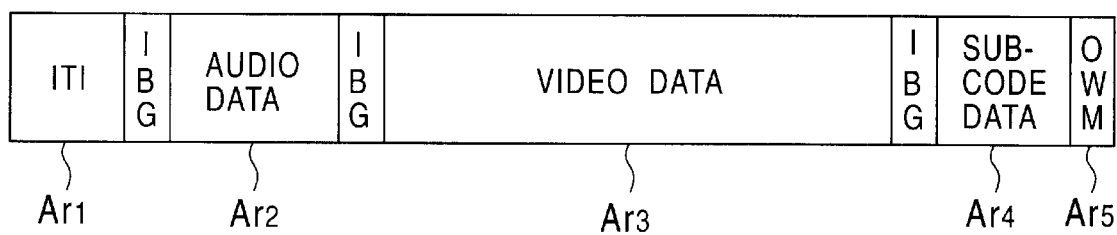
FIG. 2 is a view showing a recording-data format in the DV method.

An embodiment of the present invention will be described below by referring to the drawings.

(1) Recording Method in the Present Embodiment

A recording method to which the present invention is applied will be described below by comparing it with the conventional DV method. The recording method to which the present invention is applied is a method for recording video and audio signals (hereinafter called DV data) conforming to the DV-method data format into 8-mm tape, and is called a digital 8-mm method in the following description.

In the DV method, as shown in FIG. 1, a rotating drum 2 having a diameter of 21.7 mm is rotated in a direction indicated by "$a_1$" at a rotating speed of 9000/1.001 rpm in the NTSC system and of 9000 rmp in the PAL system against DV tape 1 having a tape width of 6.35 mm to record DV data.

In this case, two magnetic heads 3A and 3B having different azimuth angles are mounted at positions 180 degrees apart on the rotating drum 2. Therefore, the two magnetic heads 3A and 3B alternately scan the DV tape 1 which runs in a direction indicated by "$b_1$" at a predetermined angle. As a result, tracks 4 are sequentially formed at angles in the longitudinal direction of the DV tape 1 as shown in FIG. 1.

In the DV method, when tracks 4 formed by one of the magnetic heads 3A and 3B are named odd-numbered tracks $O_1, O_3, O_5, \ldots$, and tracks 4 formed by the other of the magnetic heads 3A and 3B are named even-numbered tracks $E_2, E_4, E_6, \ldots$, DV data of one frame is separately recorded into a total of 10 tracks 4 formed of five odd-numbered tracks $O_1, O_3, \ldots$ and five even-numbered tracks $E_2, E_4, \ldots$ in the NTSC system and separately recorded into a total of 12 tracks 4 formed of six odd-numbered tracks $O_1, O_3, \ldots$ and six even-numbered tracks $E_2, E_4, \ldots$ in the PAL system.

FIG. 2 shows a data format in each track 4 in the DV method. Each track 4 is provided with, sequentially from a head entering side, an insert and track information (ITI) area $Ar_1$, an inter-block gap (IBG), an audio data area $Ar_2$, an IBG, a video data area $Ar_3$, an IBG, a sub-code data area $Ar_4$, and an extension area $Ar_5$ as clearly shown in FIG. 2.

The ITI area $Ar_1$, stores various types of information related to tracks, such as pilot-frame data described later. The audio data area $Ar_2$ and the video data area $Ar_3$ store audio data and video data, respectively. The sub-code data area $Ar_4$ stores sub codes. The extension area $Ar_5$ and the IBGs record no data.

In the DV method, two adjacent tracks 4 are paired from the top of a frame sequentially. Data indicating a sequential number (hereinafter called a track-pair number) assigned to each pair and starting from zero in a frame is stored in the audio data area $Ar_2$ and the video data area $Ar_3$.

Therefore, in the NTSC system, data indicating a track-pair number is recorded into each track 4 from the top track 4 of a frame in the order of "0," "0," "1," "1," . . . "5," and "5." In the PAL system, data indicating a track-pair number is recorded into each track 4 from the top track 4 of a frame in the order of "0," "0," "1," "1," . . . "6," and "6."

Therefore, it is easily recognized that reproduced DV data has been recorded into which track 4 in a frame, according to the track-pair number.

On the other hand, in the digital 8-mm method, to which the present invention is applied, a rotating drum 6 having the same diameter (40 mm) as in the Analog 8-mm method is rotated in a direction indicated by "$a_2$" at a rotating speed of 4500/1.001 rpm in the NTSC system and of 4500 rmp in the PAL system against 8-mm tape 5 to record video and audio signals (DV data) conforming to the DV-method data format, as shown in FIG. 3.

Also in this case, two magnetic heads 7A and 7B having different azimuth angles are mounted at positions 180 degrees apart on the rotating drum 6. Therefore, the two magnetic heads 7A and 7B alternately scan the 8-mm tape 5 which runs in a direction indicated by "$b_2$" at a predetermined angle. As a result, tracks 8 are sequentially formed at angles in the longitudinal direction of the 8-mm tape 5 as shown in FIG. 3.

In the digital 8-mm method, DV data of two tracks in the DV method is continuously stored in one track 8 as a data pattern in the DV method. Specifically, in the digital 8-mm method, data in odd-numbered tracks $O_1$, $O_3$, $O_5$, . . . and data in even-numbered tracks $E_2$, $E_4$, $E_6$, . . . in the DV method are paired and paired data is recorded into one track 8 without changing the data contents.

More specifically, in the digital 8-mm method, data in the odd-numbered track $O_1$ and data in the even-numbered track $E_2$ in the DV method are continuously recorded into one track 8. Into the next track 8, data in the odd-numbered track $O_3$ and data in the even-numbered track $E_4$ in the DV method are continuously recorded. In the same way, data in two adjacent tracks in the DV method are paired and continuously recorded into one track 8.

Therefore, in the digital 8-mm method, video and sound data of one frame is separately recorded into five tracks 8 on 8-mm tape in the NTSC system, and is separately recorded into six tracks 8 in the PAL system.

As described above, since data of two tracks in the DV method is continuously recorded into one track 8 on the 8-mm tape 5 with the DV-method data format in the digital 8-mm method, the area of the tape is effectively used and high-quality video and sound can be recorded and reproduced for a long period of time.

(2) Automatic Track Finding (ATF) Format in the Digital 8-mm Method

An ATF format used in the digital 8-mm method will be described below.

In the DV method, one extra bit is inserted to every 24 bits (three bytes) for all data to be recorded to perform 24–25 conversion. With this operation, pilot signals having three frequencies are recorded into the entire tracks 4 (FIG. 1) for ATF.

Figure 4A:
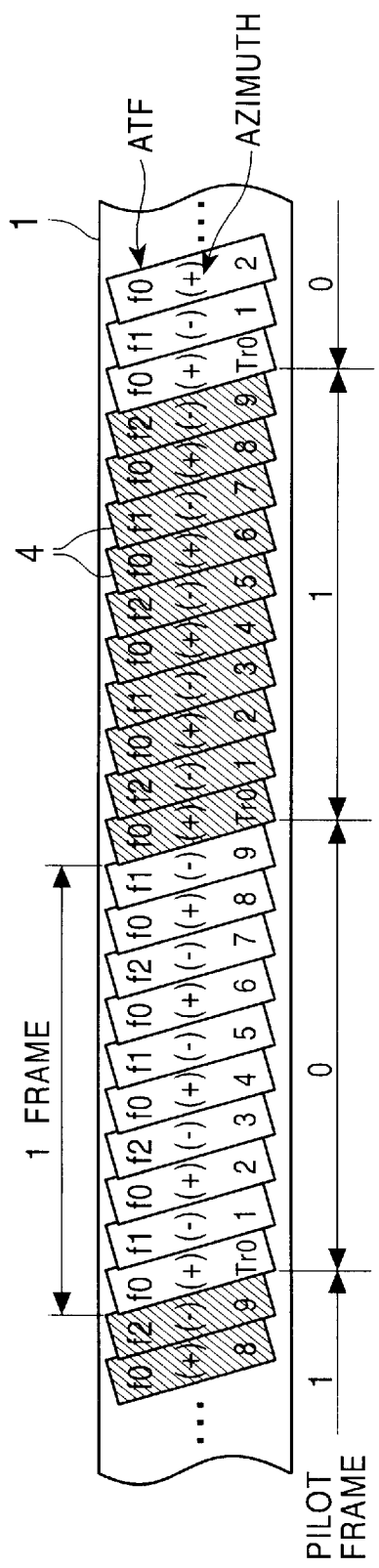
FIG. 4A is an outlined view showing an automatic track finding (ATF) format used for the NTSC system in the DV method.

Specifically, as shown in FIG. 4A and FIG. 5A, in either of the NTSC system and the PAL system, a pilot signal having a frequency f0 is recorded into odd-numbered tracks $O_1$, $O_3$, . . . , and pilot signals having frequencies f1 and f2 are alternately recorded into even-numbered tracks $E_2$, $E_4$, . . . . Therefore, into the entire tracks 4, pilot signals are repeatedly recorded in the order of those having frequencies f0, f1, f0, and f2.

As a result, in the DV method, when the magnetic head 3A scans a track 4 (an odd-numbered track) in which the pilot signal having the frequency f0 is recorded, during reproduction, the pilot signals having the frequencies f1 and f2 are reproduced as cross-talk signals from adjacent both-side tracks (even-numbered tracks). Therefore, when tracking is controlled such that the levels of the pilot signals having the frequencies f1 and f2 are the same, stable tracking is obtained.

In the DV method, an ATF pattern is f0, f1, f0, and f2, or f0, f2, f0, and f1 from the top of a frame in the NTSC method as clearly shown in FIG. 4A, and an ATF pattern is always f0, f1, f0, and f2 from the top of a frame in the PAL system as clearly shown in FIG. 5A.

It is specified in the DV method that one-bit control data called a pilot frame, indicating the order of the frequencies of pilot signals in a frame, is stored at a predetermined position in the ITI area $Ar_1$ (FIG. 2) of each track 4. It is also specified that the pilot-frame data is set to "0" when the ATF pattern is f0, f1, f0, and f2 from the top of a frame, and is set to "1" when the ATF pattern is f0, f2, f0, and f1.

Therefore, in the DV method, the pilot-frame data alternately changes between "0" and "1" in every frame in the NTSC system as shown in FIG. 4A, and the pilot-frame data is always "0" in the PAL system as shown in FIG. 5A.

On the other hand, in the digital 8-mm method, since DV data of two tracks in the DV method is continuously recorded into 8-mm tape to form one track 8 as described above, if the above-described ATF format for the DV method is applied as is, the frequency of the pilot signal is f0 at the first half of a track 8 and it is f1 or f2 at the second half of the track 8. Tracking control based on pilot signals cannot be implemented in this condition.

Figure 4B:
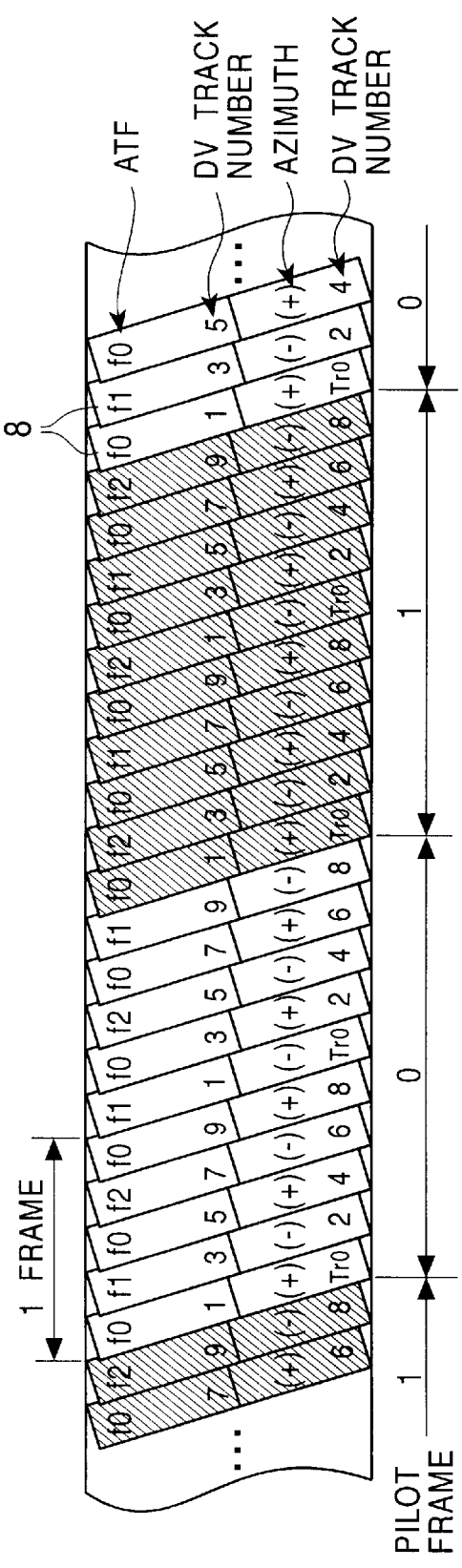
FIG. 4B is an outlined view showing an ATF format used for the NTSC system in the digital 8-mm method.

Therefore, in the present embodiment, pilot signals are recorded into tracks 8, one for each track 8 of the digital 8-mm method, so as to have frequencies of f0, f1, f0, and f2 repeatedly in this order as an ATF format in the digital 8mm method as shown in FIG. 4B and FIG. 5B.

When such an ATF format is employed in the digital 8-mm method, an ATF pattern from the top of a frame is f0, f1, f0, f2, . . . or f0, f2, f0, f1, . . . in the PAL system as shown in FIG. 5B, whereas an ATF pattern from the top of a frame is f1, f0, f2, f0, . . . or f2, f0, f1, f0, . . . , in addition to f0, f1, f0, f2, . . . or f0, f2, f0, f1, . . . in the NTSC system. For such ATF patterns, pilot-frame data is not specified in the DV method.

Therefore, in the present embodiment, the pilot-frame data is recorded such that it is set to "0" when the ATF pattern from the top of a frame is f0, f1, f0, f2, ... or f1, f0, f2, f0, ..., and is set to "1" when the ATF pattern is f0, f2, f0, f1, ... or f2, f0, f1, f0.

As a result, the pilot-frame data alternately changes between "0" and "1" every two frames in the NTSC system as shown in FIG. 4B, and the pilot-frame data alternately changes between "0" and "1" every frame in the PAL system as shown in FIG. 5B.

When the pilot-frame data is recorded in the way described above in the digital 8-mm method, the frequencies of pilot signals to be used for the next scene are easily determined.

Figure 6:
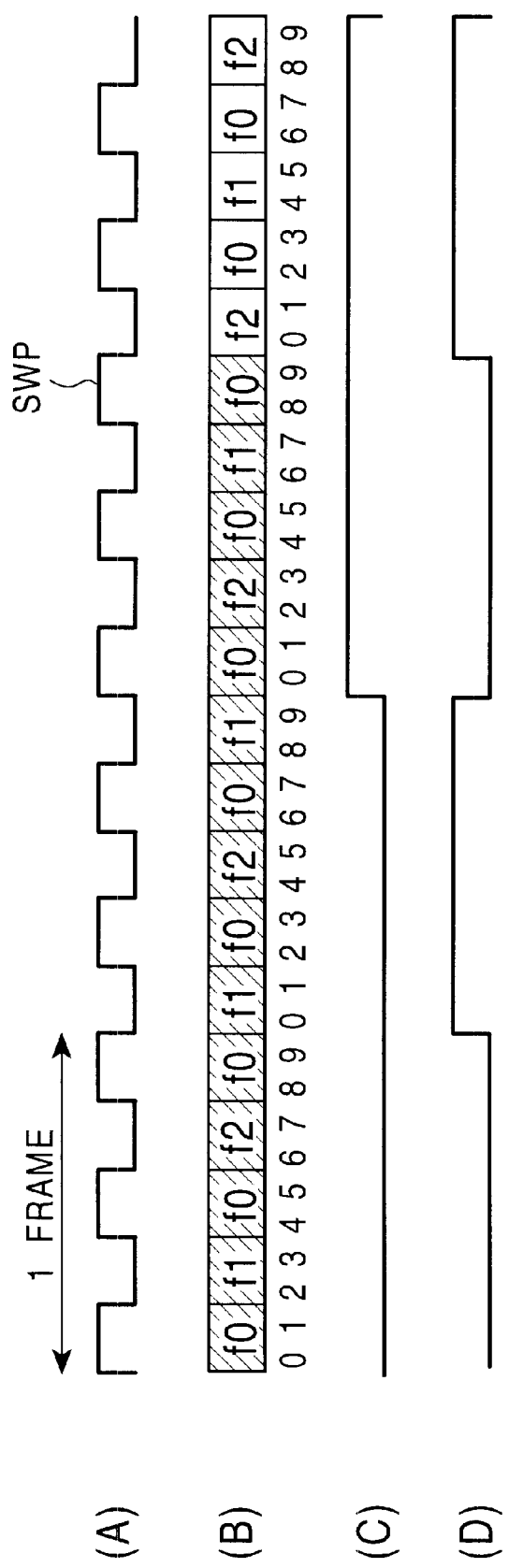
FIG. 6 is a timing chart showing the relationship between the frequencies of pilot signals, and DV track numbers and first and second pilot-frame signals in the NTSC system.

FIG. 6 shows the relationship between the frequencies of pilot signals and pilot-frame data in the NTSC system when the pilot-frame data is recorded as described above in the digital 8-mm method, and FIG. 7 shows the corresponding relationship in the PAL system.

Figure 7:
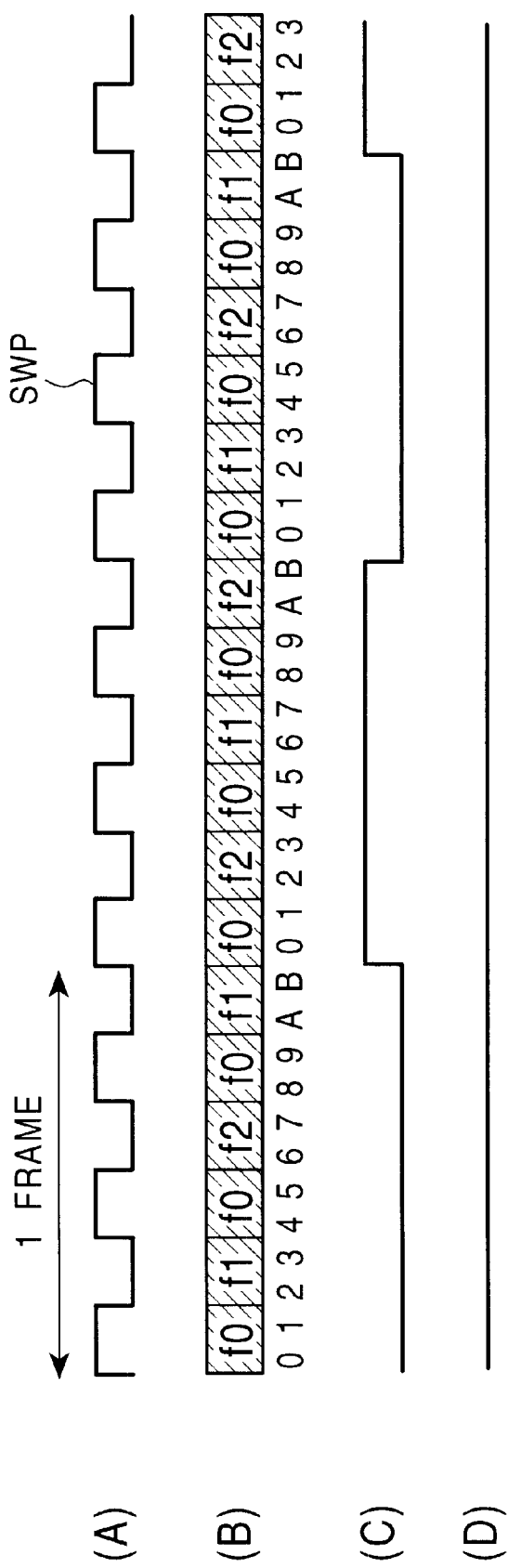
FIG. 7 is a timing chart showing the relationship between the frequencies of pilot signals, and DV track numbers and first and second pilot-frame signals in the PAL system.

In each of FIGS. 6 and 7, (A) indicates switching pulses SWP during recording and reproduction, and (B) indicates an ATF pattern in the digital 8-mm method. Numbers (0 to 9 for the NTSC system, and 0 to 9, A, and B for the PAL system) shown below the frequencies in (B) indicate consecutive numbers (hereinafter called DV-track numbers) assigned for convenience from the top of a frame to DV data of one track in the DV method, recorded into tracks 8 in the digital 8-mm method.

In each of FIGS. 6 and 7, (C) indicates a rectangular-shaped signal (hereinafter called a first pilot-frame signal) showing pilot-frame data recorded as described above in the digital 8-mm method by logical levels, and (D) indicates a rectangular-shaped signal (hereinafter called a second pilot-frame signal) showing track-frame data assigned to DV data having each DV track number in the DV system, by logical levels.

The DV track numbers can be generated according to the track-pair numbers described above, included in DV data in the tracks 8 in the digital 8-mm method. The DV pilot-frame data can be detected according to the logical level of the switching pulse corresponding to a DV track number.

It is understood clearly from FIGS. 6 and 7 that the frequency of a pilot signal is uniquely determined according to the DV track number and the logical levels of the first and second pilot-frame signals in either of the NTSC system and the PAL system when the ATF pattern correctly repeats f0, f1, f0, and f2.

Therefore, in the digital 8-mm method, when the pilot-frame data is recorded as described above, a DV track number and the first and second pilot-frame signals are generated according to the track-pair number and the pilot-frame data included in DV data for video and sound (hereinafter called previous video and sound) which has been recorded into 8-mm tape, for the next scene. The frequency of a pilot signal to be superposed on each track 8 for video and sound (hereinafter called next-scene video and sound) to be recorded on the 8-mm tape for the next scene is easily determined such that the ATF pattern repeats f0, f1, f0, and f2 against the ATF pattern of the previous video and sound according to the generated DV track number of the generated first and second pilot-frame signals.

When the pilot signal having the frequency determined in this way is sequentially superposed on each track 8 for the next-scene video and sound in the digital 8-mm method, tracking loss is prevented during reproduction at the boundary of the previous video and sound and the next-scene video and sound. Therefore, high-quality video and sound are reproduced with tracking always being maintained.

(3) Structure of a Digital Video Camera According to the Present Embodiment

Figure 8:
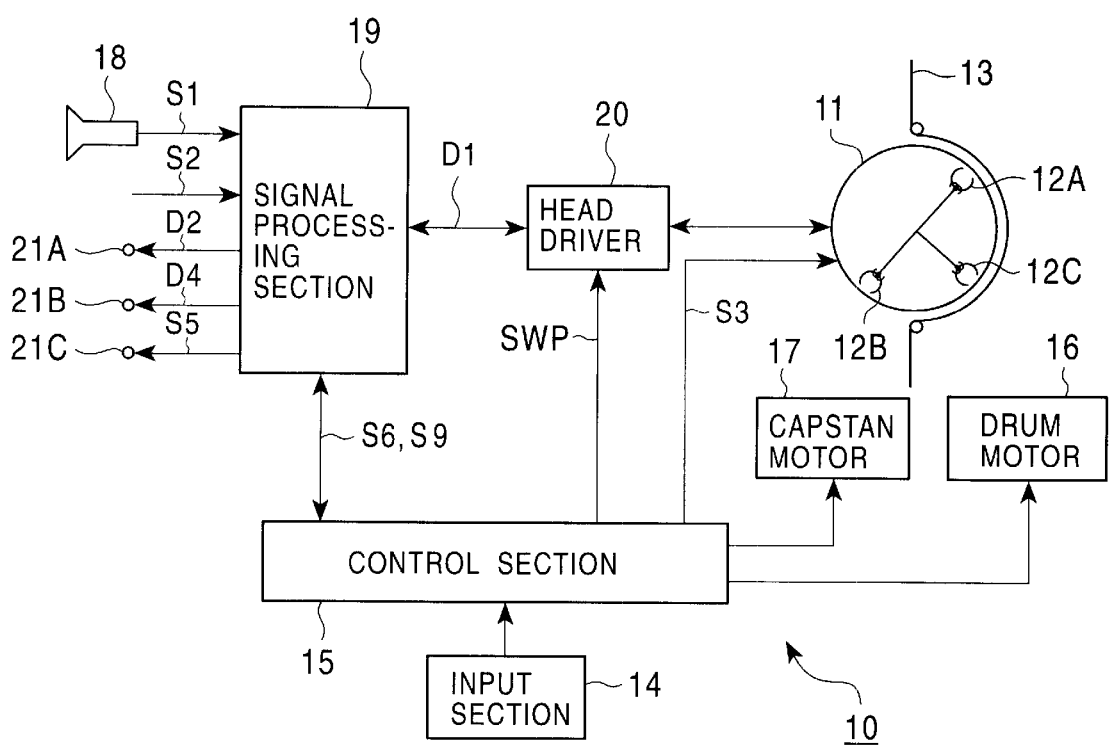
FIG. 8 is a block diagram of a digital video camera according to an embodiment of the present invention.

FIG. 8 shows a digital video camera according to the present embodiment. Two magnetic heads 12A and 12B having different azimuth angles are mounted on a rotating drum 11 at positions 180 degrees apart. With these two magnetic heads 12A and 12B, video and audio signals are recorded into or reproduced from 8-mm tape 13 by the digital 8-mm method.

In this digital video camera 10, when an input section 14 is operated to select a recording mode, a control section 15 controls a drum motor 16 and a capstan motor 17 such that the rotating drum 11 rotates at a predetermined rotating speed and the 8-mm tape 13 loaded so as to wind around the rotating drum 11 by a predetermined angle moves at a predetermined speed.

A pickup section 18 formed of a lens system and a charge coupled device (CCD) converts the optical image of an object to an electric signal and sends an obtained video signal S1 having an analog waveform to a signal processing section 19. The signal processing section 19 also receives an audio signal S2 having an analog waveform from a microphone not shown.

Under the control of the control section 15, the signal processing section 19 sequentially applies predetermined signal recording processing corresponding to the DV method, such as digital conversion processing, encoding processing, multiplexing processing, error-correcting processing, 24/25 conversion processing (namely, pilot-signal adding processing), modulation processing, and processing for adding control data indicating a track-pair number and pilot-frame data, to the video signal S1 and to the audio signal S2, and sequentially sends obtained DV data D1 to a head driver 20.

The head driver 20 sends the DV data D1 to the magnetic heads 12A and 12B in units of two tracks in the DV method at timing when the magnetic heads 12A and 12B scan the 8-mm tape 13, according to switching pulses SWP given from the control section 15.

A flying erase head 12C having a head width of two tracks in the digital 8-mm method is mounted at the middle of the two magnetic heads 12A and 12B on the rotating drum 11, and receives a deletion signal S3 from the control section 15.

As a result, in the digital video camera 10, when DV data D1 has been recorded on the 8-mm tape 13 by the digital 8-mm method, the DV data D1 is deleted in units of two tracks in the digital 8-mm method by the flying erase head 12C and DV data D1 of two tracks in the DV method is continuously recorded into one track 8 (FIG. 3) on the 8-mm tape 13 by the magnetic heads 12A and 12B.

In the digital video camera 10, the video signal S1 output from the pickup section 18 and the audio signal S2 output from the microphone are recorded on the 8-mm tape 13 by the digital 8-mm method during the recording mode in this way.

When the input section 14 is operated to select a reproduction mode, the control section 15 controls the drum motor 16 and the capstan motor 17 such that the rotating drum 11 rotates at the same predetermined rotating speed as in the recording mode and the 8-mm tape 13 loaded so as to wind around the rotating drum 11 by the predetermined angle moves at the same predetermined speed as in the recording mode.

As a result, every time the rotating drum 11 rotates by one turn, DV data D1 of one track in the digital 8-mm method (corresponding to two tracks in the DV method) is sequentially reproduced by the magnetic heads 12A and 12B, and is sent to the signal processing section 19 through the head driver 20.

Under the control of the control section 15, the signal processing section 19 outputs the received DV data D1 to the outside through a DV-data output terminal 21A, applies predetermined signal reproduction processing corresponding to the DV method, such as demodulation processing, error-correcting processing, processing for separating video data and audio data, decoding processing of the video data and the audio data, and analog conversion processing of the video data and the analog data, to the DV data D1 received through the head driver 20, and also outputs an obtained video signal S4 and an obtained audio signal S5 both having analog waveforms to the outside through a video output terminal 21B and an audio output terminal 21C.

The signal processing section 19 also extracts a pilot signal added to the DV data D1 and sends it to the control section 15. The control section then control the rotating speed of the capstan motor 17 according to the pilot signal to perform tracking control.

In this way, the DV data D1 recorded on the 8-mm tape 13 by the digital 8-mm method is reproduced and output to the outside during the reproduction mode in the digital video camera 10.

(4) Detailed Processing in the Control Section

The control section 15 rotates the rotating drum 11 at a predetermined speed and moves the 8-mm tape 13 at a predetermined speed during the recording mode as described above. As a result, when video and audio DV data D1 has been recorded on the 8-mm tape 13 as in taking the next scene, the DV data D1 is reproduced by the magnetic heads 12A and 12B and sent to the signal processing section 19 through the head driver 20.

The signal processing section 19 enters the reproduction mode for a short period of time under the control of the control section 15. When the signal processing section 19 receives the DV data D1 through the head driver 20, for example, it detects a track-pair number and pilot-frame data included in the DV data D1 and sends a detection result to the control section 15 as a control-information detection signal S6.

Figure 9:
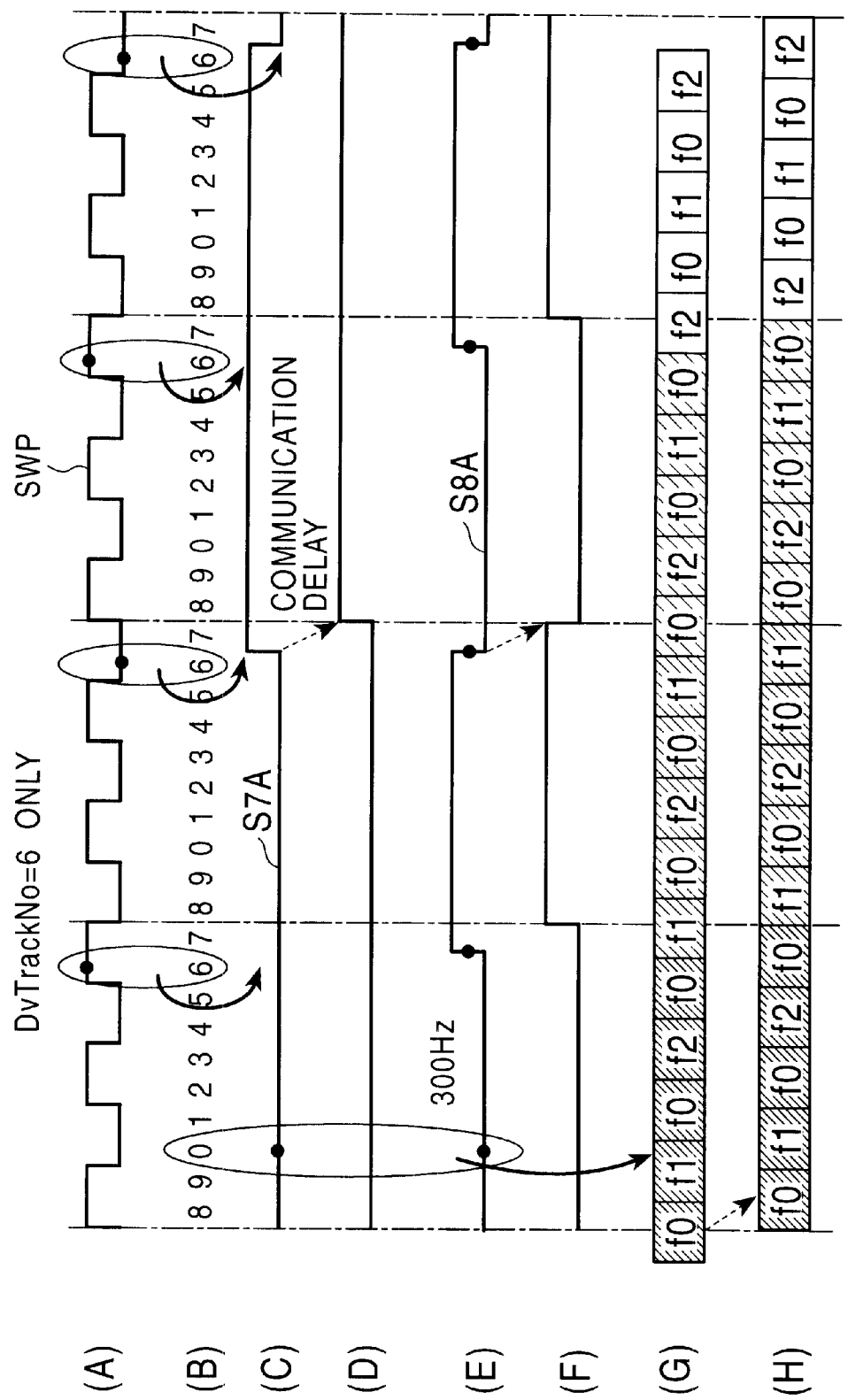
FIG. 9 is a timing chart showing the relationship between the frequencies of pilot signals, and DV track numbers and first and second pilot-frame signals in the NTSC system in the digital video camera shown in FIG. 8.
Figure 10:
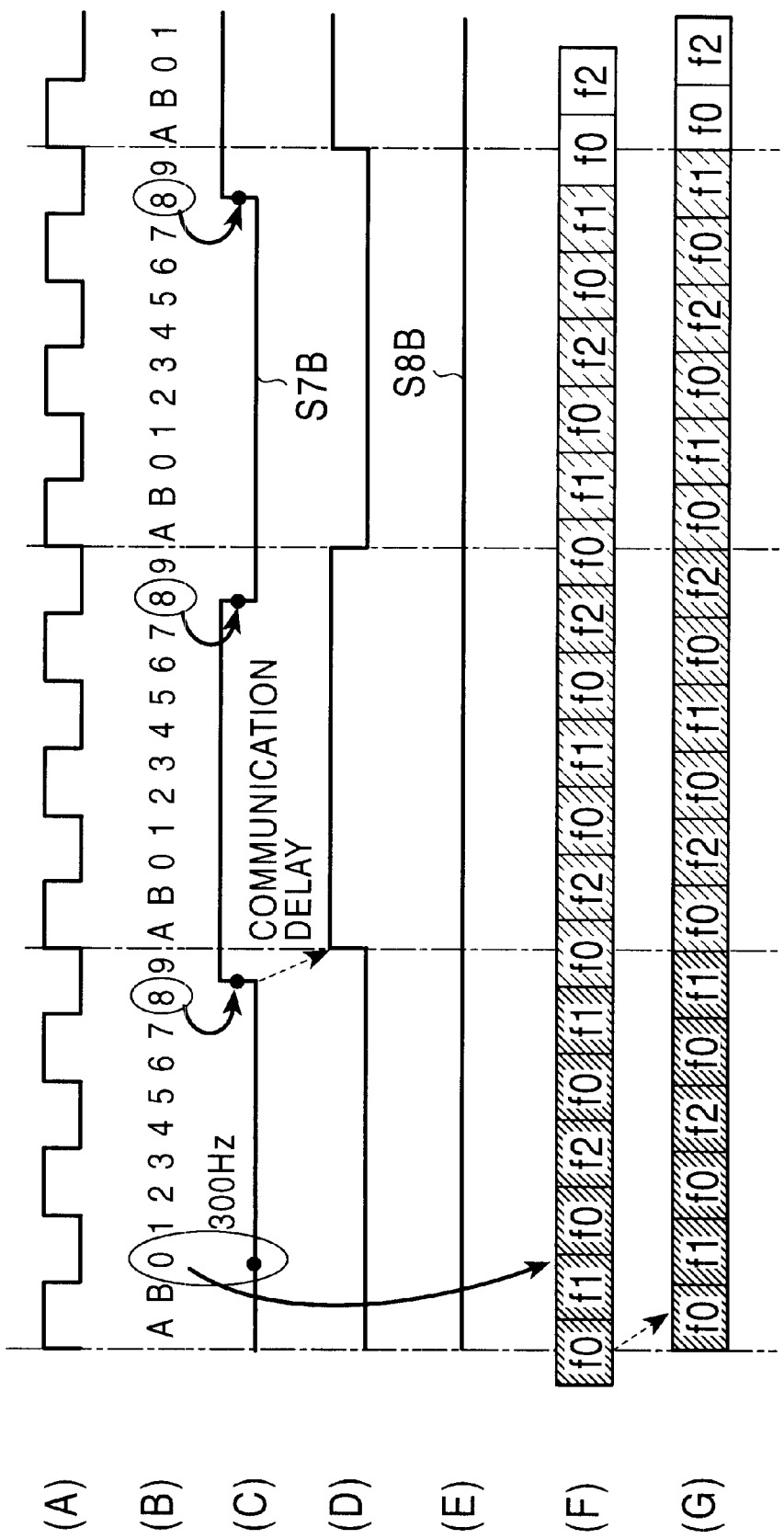
FIG. 10 is a timing chart showing the relationship between the frequencies of pilot signals, and DV track numbers and first and second pilot-frame signals in the PAL system in the digital video camera shown in FIG. 8.

When the control section 15 receives the control-information detection signal S6, which includes a track-pair number, from the signal processing section 19, it generates the DV track numbers (0 to 9 in the NTSC system as shown by (B) in FIG. 9, and 0 to 9, A, and B in the PAL system as shown by (B) in FIG. 10) of the corresponding track 8 according to the track-pair number, and then continuously generates two DV track numbers at a constant interval every time the switching pulses SWP are inverted.

In the digital video camera 10, a track-pair number included in reproduced DV data D1 is detected by the signal processing section 19, and then sent to the control section 15 at timing when the switching pulses SWP are inverted next.

Therefore, DV track numbers are generated with a delay of half the period of the switching pulses SWP after a track-pair number is actually detected, in the control section 15. Consequently, when a DV track number of "8" in the NTSC system ((B) in FIG. 9) or "A" in the PAL system ((B) in FIG. 10) is generated in the control section 15, the reproduction of the top track 8 of the next frame is actually started, or the generation of a new track 8 is actually started for taking the next scene.

In addition to the above generation processing of DV track numbers, the control section 15 generates the above-described first pilot-frame signal S7A (shown by (C) in FIG. 9) or S7B (shown by (C) in FIG. 10) which has the pilot frame data given from the signal processing section 19 as an initial value, according to the pilot-frame data included in the control-information detection signal S6 sent from the signal processing section 19, a DV track number, and the logical level of the switching pulses SWP.

Specifically, the control section 15 generates the first pilot-frame signal S7A so as to invert its logical level when the DV track number generated inside is "6" and the logical level of the switching pulses SWP is "0" in the NTSC system as shown by (A) to (C) in FIG. 9; and generates the first pilot-frame signal S7B so as to invert its logical level when the DV track number generated inside is "8" in the PAL system as shown by (A) to (C) in FIG. 10, with a communication delay, described later, generated when the first pilot-frame signal S7A or S7B is sent to the signal processing section 19 being taken into account.

The control section 15 also generates the above-described pilot-frame signal S8A (shown by (E) in FIG. 9) or S8B (shown by (E) in FIG. 10) according to the logical level of the switching pulses SWP and a DV track number.

Specifically, in synchronization with the first pilot-frame signal, the control section 15 generates the second pilot-frame signal S8A so that it rises when the DV track number generated inside is "6" and the logical level of the switching pulses SWP is "1" and it falls when the DV track number is "6" and the logical level of the switching pulses SWP is "0" in the NTSC system as shown by (A), (B), and (E) in FIG. 9; and generates the second pilot-frame signal S8B always having a logical level of "0" in the PAL system as shown by (E) in FIG. 10.

The control section 15 sends the deletion signal S3 (FIG. 8) to the flying erase head 12C (FIG. 8) at timing when the first pilot-frame signal S7A or S7B obtained in the foregoing way changes its logical level, and at the same time has the signal processing section 19 start signal recording processing to start a recording operation.

The control section 15 sequentially determines the frequency (shown in (G) of FIG. 9 and (F) of FIG. 10) of a pilot signal to be recorded in each track 8 to be newly formed on the 8-mm tape 13 by a recording operation such that an ATF pattern of f0, f1, f0, and f2 continues even at the boundary of previous video and sound and next-scene video and sound, according to the DV track number, and the logical levels of the first pilot-frame signal S7A or S7B and the second pilot-frame signal S8A or S8B, and sends a determination result to the signal processing section 19 as a frequency determination signal S9. As a result, according to this frequency determination signal S9, the signal processing section 19 applies 24/25 conversion processing as described above. DV data to which the pilot signal having the frequency determined by the control section 15 has been attached is thus generated and is recorded on the 8-mm tape 13 (shown by (H) in FIG. 9 and (G) in FIG. 10).

The control section 15 further sends the first pilot-frame signal S7A or S7B to the signal processing section 19. In the signal processing section 19, after the pilot frame data obtained according to the first pilot-frame signal S7A or S7B is stored at a predetermined position in the corresponding DV data, the DV data is recorded on the 8-mm tape (shown by (D) in FIG. 9 and (D) in FIG. 10).

When new 8-mm tape 13 is used during the recording mode, for example, DV data is not reproduced from the 8-mm tape 13 at an early stage of the recording mode, and therefore, the signal processing section 19 does not send the control-information detection signal S6, which includes a track-pair number and pilot frame data, to the control section 15.

In this case, the control section 15 sequentially generates the above-described DV track numbers by itself according to the switching pulses SWP, and also generates the first pilot-frame signal S7A or S7B and the second pilot-frame signal S8A or S8B according to the generated DV track numbers and the logical levels of the switching pulses SWP.

The control section 15 executes the same processing as for the next scene described above according to the DV track number, the first pilot-frame signal S7A or S7B and the second pilot-frame signal S8A or S8B to store pilot frame data which has its value inverted at an interval of two frames in the NTSC system or of one frame in the PAL system, in DV data, and records the DV data on the 8-mm tape 13 while a pilot signal having a predetermined frequency is superposed thereon so that an ATF pattern of f0, f1, f0, and f2 continues even at the boundary of previous video and sound and next-scene video and sound.

When the DV data is recorded on the 8-mm tape in this way, if DV data reproduced from the 8-mm tape 13 is output to the outside as is, pilot-frame data included in each DV data does not conform to the DV method and compatibility cannot be obtained with units conforming to the DV method.

Therefore, the control section 15 generates the second pilot-frame signal S8A or S8B according to a track-pair number included in the control-information detection signal S6 sent from the signal processing section 19, and sends it to the signal processing section 19 during the reproduction mode in the same way as in the recording mode.

The signal processing section 19 changes the pilot-frame data of reproduced DV data to the logical level of the second pilot-frame signal S8A or S8B sent from the control section 15, and outputs the DV data to the outside through the DV-data output terminal 21A.

As described above, the digital video camera 10 can output DV data conforming to the DV method as reproduced DV data, and maintains compatibility with other units.

(5) Operation and Effect in the Present Embodiment

With the above structure, the digital video camera 10 records DV data having the data format of the DV method in one track on the 8-mm tape 13 by the magnetic heads 12A and 12B, mounted on the rotating drum 11, in units of two tracks in the DV method during the recording mode.

Since the digital video camera 10 records data of two tracks in the DV method continuously in one track on 8-mm tape, which is wider than DV tape, a tape area is effectively used and high-quality video and audio signals can be recorded for a long period of time.

In addition, in this case, since pilot-frame data included in DV data is inverted at an interval of two frames in the NTSC system or of one frame in the PAL system in the digital video camera 10, the determination of the frequency of a pilot signal to be recorded into each track of video and audio signals for the next scene such that tracking is maintained even at the boundary of previous video and sound and next-scene video and sound during reproduction is simplified according to pilot-frame data included in each DV data of previous video and sound during recording of the next scene.

Since the determination of the frequency of a pilot signal to be recorded into each track of next-scene video and sound is simplified in this way, the corresponding circuit structure and program are also simplified.

With the above structure, since DV data having the data format of the DV method is recorded in one track on 8-mm tape in units of two tracks in the DV method during the recording mode, a tape area is effectively used and a digital video camera which can record video and audio signals for a long period of time with high quality is implemented. In this case, since pilot-frame data included in DV data is inverted at an interval of two frames, the determination of the frequency of a pilot signal to be recorded into each track for the next scene is simplified, and therefore, a digital video camera which can simplify the corresponding circuit structure and program is implemented.

(6) Modifications

In the above embodiment, the present invention is applied to a digital video camera. The present invention can also be applied to units other than a digital video camera, such as installation-type digital video tape recorders.

In the above embodiment, the signal processing section 19 has the functions of recording-data generation means for generating recording data having the data format of the DV method, of control-data extracting means for extracting pilot-frame data formed of one-bit control data from DV data D1 reproduced from the 8-mm tape 13, and of control-data changing means for changing pilot-frame data included in DV data D1 reproduced from the 8-mm tape 13 to a value corresponding to the DV method during reproduction. In addition to this case, the present invention can also be applied to a case in which the functions of the recording-data generation means and the control-data extracting means are implemented by a signal processing circuit in a usual video camera conforming to the DV method, and the control section 15 has the function of the control-data changing means.

In the above embodiment, the present invention is applied to the digital video camera 10, which records recording data having the data format of the DV method on the 8-mm tape 13. In addition to this case, the present invention can also be applied to magnetic recording apparatuses and magnetic recording and reproduction apparatuses which record recording data having the data format of a digital recording method other than the DV method on magnetic tape other than that 8 mm wide.

In this case, recording-data generation means for generating recording data, recording means (the head driver 20, the rotating drum 11, the magnetic heads 12A and 12B, and the flying erase head 12C in the above embodiment) for recording recording data on magnetic tape, and reproduction means (the same as the recording means in the above embodiment) for reproducing recording data recorded on the magnetic tape need to be configured correspondingly to a digital recording method used.

What is claimed is:

1. A magnetic recording apparatus comprising:
  recording-data generation means for applying predetermined signal processing which includes processing for adding a pilot signal for tracking control, to a video signal to generate recording data having a data format corresponding to a predetermined digital recording method; and
  recording means for sequentially recording the recording data generated by the recording-data generation means, of two tracks in the digital recording method continuously in one track on magnetic tape, wherein the recording-data generation means places in the recording data one-bit control data indicating the arrangement of the frequencies of pilot signals in tracks on the magnetic tape, the one-bit control data being inverted at an interval of two frames in the NTSC system and of one frame in the PAL system.

2. A magnetic recording apparatus according to claim 1, wherein the Digital Video method is used as the digital recording method, and the magnetic tape has a tape width conforming to the Analog 8-mm method.

3. A magnetic recording method comprising:

a first step for applying predetermined signal processing which includes processing for adding a pilot signal for tracking control, to a video signal to generate recording data having a data format corresponding to a predetermined digital recording method; and a second step for sequentially recording the generated recording data of two tracks in the digital recording method continuously in one track on magnetic tape, wherein, in the first step, one-bit control data indicating the arrangement of the frequencies of pilot signals in tracks on the magnetic tape, the one-bit control data being inverted at an interval of two frames in the NTSC system and of one frame in the PAL system, is placed in the recording data.

4. A magnetic recording method according to claim 3, wherein the Digital Video method is used as the digital recording method, and the magnetic tape has a tape width conforming to the Analog 8-mm method.

5. A magnetic recording and reproduction apparatus comprising:

recording-data generation means for applying predetermined signal recording processing which includes processing for adding a pilot signal for tracking control, to a video signal to generate recording data having a data format corresponding to a predetermined digital recording method; and recording means for sequentially recording the recording data generated by the recording-data generation means, of two tracks in the digital recording method continuously in one track on magnetic tape, wherein the recording-data generation means places in the recording data one-bit control data indicating the arrangement of the frequencies of pilot signals in tracks on the magnetic tape, the one-bit control data being inverted at an interval of two frames in the NTSC system and of one frame in the PAL system.

6. A magnetic recording and reproduction apparatus according to claim 5, wherein the Digital Video method is used as the digital recording method, and the magnetic tape has a tape width conforming to the Analog 8-mm method.

7. A magnetic recording and reproduction apparatus according to claim 5, further comprising:

reproduction means for reproducing the recording data recorded on the magnetic tape;

control-data extracting means for extracting the control data from the recording data reproduced by the reproduction means; and control means, wherein the control means has the reproduction means reproduce the recording data which has been formed in tracks on the magnetic tape;

the control means has the control-data extracting means extract the control data from the reproduced recording data;

when the recording data based on the video data is recorded, the control means sequentially determines the frequencies of pilot signals to be superposed on the recording data based on the video signal, according to the extracted control data such that the arrangement of the frequencies of the pilot signals which have been recorded in tracks on the magnetic tape is followed by a predetermined pattern; and the control means controls the recording-data generation means such that the pilot signals having the determined frequencies are added to generate the recording data based on the video signal.

8. A magnetic recording and reproduction apparatus according to claim 5, further comprising control-data changing means for changing the control data included in the recording data reproduced from the magnetic tape by the reproduction means to a value corresponding to the digital recording method and for outputting it to the outside.

9. A magnetic recording and reproduction method comprising:

a first step for applying predetermined signal recording processing which includes processing for adding a pilot signal for tracking control, to a video signal to generate recording data having a data format corresponding to a predetermined digital recording method; and a second step for sequentially recording the generated recording data of two tracks in the digital recording method continuously in one track on magnetic tape, wherein, in the first step, one-bit control data indicating the arrangement of the frequencies of pilot signals in tracks on the magnetic tape, the one-bit control data being inverted at an interval of two frames in the NTSC system and of one frame in the PAL system, is placed in the recording data.

10. A magnetic recording and reproduction method according to claim 9, wherein the Digital Video method is used as the digital recording method, and the magnetic tape has a tape width conforming to the Analog 8-mm method.

11. A magnetic recording and reproduction method according to claim 9, wherein, in the first step, the recording data which has been formed in tracks on the magnetic tape is reproduced;

the control data is extracted from the reproduced recording data;

the frequencies of pilot signals to be added to the recording data based on the video signal are sequentially determined according to the extracted control data such that the arrangement of the frequencies of the pilot signals which have been recorded in tracks on the magnetic tape is followed by a predetermined pattern; and the pilot signals having the determined frequencies are added to generate the recording data based on the video signal.

12. A magnetic recording and reproduction method according to claim 9, further comprising:

a third step for reproducing the recording data based on the video signal from the magnetic tape; and a fourth step for changing the control data included in the reproduced recording data to a value corresponding to the digital recording method and for outputting it to the outside.

* * * * *